T. J. Lovegrove,
Casting Iron Pipe.
N° 5988.           Patented Dec. 26, 1848.
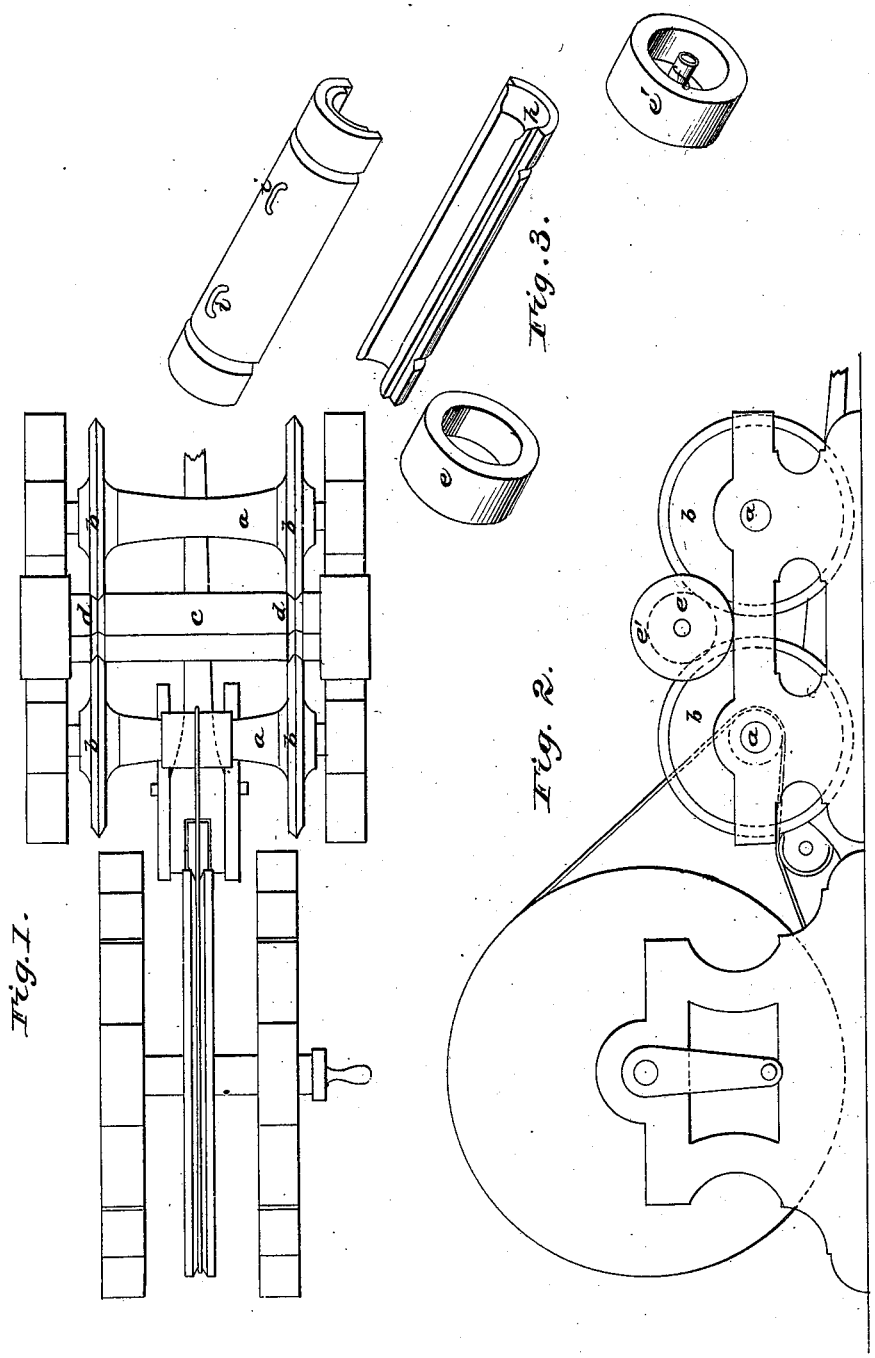

UNITED STATES PATENT OFFICE.

THOS. J. LOVEGROOVE, OF BALTIMORE, MARYLAND.

METHOD OF EMPLOYING CENTRIFUGAL FORCE IN THE CASTING OF IRON PIPE.

Specification forming part of Letters Patent No. 5,988, dated December 26, 1848.

*To all whom it may concern:*

Be it known that I, THOS. J. LOVEGROOVE, of Baltimore, in the county of Baltimore and State of Maryland, have invented certain new and useful Improvements in Casting Metal Pipes; and I do hereby declare that the following is a full, clear, and exact description of the principle or character which distinguishes them from all other things before known, and of the usual manner of making, modifying, and using the same, reference being had to the accompanying drawings, in which—

Figure 1 is a plan of the apparatus. Fig. 2 is an elevation. Fig. 3 is an isometrical projection of the parts of the mold detached.

My invention consists in forming pipes of cast metal by causing the mold into which the melted material is put to revolve with sufficient force to cause it to be thrown out against the sides of the mold with sufficient force to form a stratum there of a proper thickness, regulated by the hole through the head of the mold, as hereinafter more particularly described, or by the quantity of metal introduced.

The mold may be caused to revolve in any convenient way, one method being shown in the drawings. This consists of two axles, $a$, placed parallel to each other, and each having near their ends, just inside of the bearings, two wheels, $b$, the periphery of which may be, as exhibited in the drawings, of angular form. These wheels receive the mold $c$ upon them, a groove, $d$, being formed around the mold in which the wheels run, and hold it steady while revolving. The wheels $b$ may be turned by any convenient power, and the velocity be such as to effect the purpose intended—viz., that of keeping the metal out of the inner surface of the mold, leaving a true cylindrical hole through its center, without the expense of forming a core or the risk of placing it out of the center in casting. By this means I insure a perfect pipe, equally thick on all sides.

The mold is made in the following way: It is divided into two or more parts, (see Fig. 3,) parallel with the plane of its axis, and onto each end there is a cap, $e\ e'$, fitted, that holds the parts together. These caps have a hole through their center at the end, the exact size that the hole in the pipe is to be made, and from the hole in $e'$ a short tube, $f$, projects, which is the size of the interior bore of the mold or outside of the pipe. Opposite this tube, when the mold is put together, the interior is enlarged, as shown at $h$. This is intended for forming the pipe in the ordinary way for fitting together. For some purposes it may be omitted. $i\ i$ are handles for removing the mold by.

To operate this mold after it is put together it is put in motion, revolving rapidly on its own axis. The melted metal is poured in through one of the holes in the center of the caps, as above named. It is immediately forced outward by the rapid revolution of the mold, and coats the whole interior thereof to a thickness equal to the difference between the diameter of the bore of the mold and that of the hole through cap. Should any more metal enter, it will be thrown out through the said holes in the caps. The motion is kept up till the metal chills sufficiently to retain its form. It is then removed, the caps knocked off, and the mold separated, which completes the operation.

Having thus fully described my improvement, what I claim therein as new, and for which I desire to secure Letters Patent, is—

Forming pipes of cast-iron or other suitable metal by causing the mold into which the metal is poured to revolve with a velocity sufficient to cause the metal to assume a tubular form around the inside of the mold without the employment of a core.

T. J. LOVEGROOVE.

Witnesses:
J. J. GREENOUGH,
WM. GREENOUGH.